United States Patent
Nicole et al.

(10) Patent No.: US 12,279,568 B2
(45) Date of Patent: Apr. 22, 2025

(54) BOLTING CONTROL USING LIGHT WITH HIGH LEVEL OF FAR RED

(71) Applicant: SIGNIFY HOLDING B.V., Eindhoven (NL)

(72) Inventors: Céline Catherine Sarah Nicole, Eindhoven (NL); Jarno Mooren, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 1075 days.

(21) Appl. No.: 17/050,725

(22) PCT Filed: Apr. 24, 2019

(86) PCT No.: PCT/EP2019/060427
§ 371 (c)(1),
(2) Date: Oct. 26, 2020

(87) PCT Pub. No.: WO2019/206397
PCT Pub. Date: Oct. 31, 2019

(65) Prior Publication Data
US 2021/0112727 A1    Apr. 22, 2021

(30) Foreign Application Priority Data
Apr. 26, 2018  (EP) .................................... 18169393

(51) Int. Cl.
*A01G 7/04*    (2006.01)
*H05B 45/10*   (2020.01)
*H05B 45/20*   (2020.01)

(52) U.S. Cl.
CPC ............. *A01G 7/045* (2013.01); *H05B 45/10* (2020.01); *H05B 45/20* (2020.01)

(58) Field of Classification Search
CPC ................................. A01G 7/045; A01G 9/249
See application file for complete search history.

(56) References Cited

U.S. PATENT DOCUMENTS

| | | |
|---|---|---|
| 5,269,093 A | 12/1993 | Horaguchi et al. |
| 9,854,749 B2 | 1/2018 | Klase et al. |
| 9,872,357 B1 | 1/2018 | Aikala |
| 10,112,814 B1 * | 10/2018 | Shelor ................... A01G 22/00 |
| 2012/0218750 A1 | 8/2012 | Klase et al. |

(Continued)

FOREIGN PATENT DOCUMENTS

| | | |
|---|---|---|
| CN | 105309237 A | 2/2016 |
| JP | H09131133 A | 5/1997 |

(Continued)

*Primary Examiner* — Son T Nguyen (57) ABSTRACT

The invention provides a method of providing horticulture light to a plant (1) in a horticulture arrangement (1000), the method comprising providing during a controlling mode first horticulture light (1111) to the plant (1) wherein at least 15% of the photons of the first horticulture light (1111) have a wavelength selected from the range of 700-800 nm, wherein at least 45% of the photons of the first horticulture light (1111) have a wavelength 5 selected from the range of 640-700 nm, and wherein at maximum 10% of the photons of the first horticulture light (1111) have a wavelength selected from the range of 400-500 nm.

9 Claims, 3 Drawing Sheets

(56) References Cited

U.S. PATENT DOCUMENTS

| | | | |
|---|---|---|---|
| 2013/0326946 A1* | 12/2013 | Goeschl | A01G 7/045 |
| | | | 47/58.1 LS |
| 2015/0181811 A1* | 7/2015 | Krijn | H05B 45/10 |
| | | | 362/382 |
| 2016/0000018 A1 | 1/2016 | Van Elmpt et al. | |
| 2016/0184237 A1* | 6/2016 | Lowe | A61K 31/05 |
| | | | 47/58.1 LS |
| 2017/0135290 A1 | 5/2017 | Sahni et al. | |
| 2017/0150684 A1* | 6/2017 | Vuorinen | A01G 7/045 |
| 2018/0007845 A1* | 1/2018 | Martin | A01G 9/249 |
| 2019/0183034 A1* | 6/2019 | Wargent | A01C 1/00 |

FOREIGN PATENT DOCUMENTS

| | | |
|---|---|---|
| JP | 2001250507 A | 9/2001 |
| JP | 2011045286 A | 3/2011 |
| JP | 2013042706 A | 3/2013 |
| JP | 2014147375 A | 8/2014 |
| KR | 20170123079 A | 11/2017 |
| WO | 2017012644 A1 | 1/2017 |

* cited by examiner

BOLTING CONTROL USING LIGHT WITH HIGH LEVEL OF FAR RED

CROSS-REFERENCE TO PRIOR APPLICATIONS

This application is the U.S. National Phase application under 35 U.S.C. § 371 of International Application No. PCT/EP2019/060427, filed on Apr. 24, 2019, which claims the benefit of European Patent application Ser. No. 18/169,393.8, filed on Apr. 26, 2018. These applications are hereby incorporated by reference herein.

FIELD OF THE INVENTION

The invention relates to a horticulture lighting system and to a horticulture arrangement comprising such horticulture lighting system. The invention further relates to a method for providing light to a plant, wherein such horticulture lighting arrangement may be applied, as well as to a computer program product for executing such method. Further, the invention relates to a lighting apparatus that may be used in such horticulture arrangement, horticulture lighting system or method of providing horticulture light to plant.

BACKGROUND OF THE INVENTION

Plant growth lighting devices and systems are known in the art. U.S. Pat. No. 9,854,749, for instance, describes a system for plant growth comprising a first LED device configured to emit light of a first color, wherein the first LED device is configured to emit light with a controlled beam half angle of less than or equal to 60°; and a second LED device configured to emit light of a second color, wherein the second LED device is configured to emit light in a with a controlled beam half angle of less than or equal to 60°; and wherein the system is configured to generate an emission spectrum having a first emission peak below 500 nm and a second emission peak above 600 nm. A first emission peak is at 425-475 nm, and a second emission peak is at 635-685 nm. Further, the system is configured to have a third emission peak at 500-600 nm. The photon flux of the emission spectrum contains between 5% and 10% green light.

SUMMARY OF THE INVENTION

Plants use the process of photosynthesis to convert light, $CO_2$ and $H_2O$ into carbohydrates (sugars). These sugars are used to fuel metabolic processes. The excess of sugars is used for biomass formation. This biomass formation includes stem elongation, increase of leaf area, flowering, fruit formation, etc. The photoreceptor responsible for photosynthesis is chlorophyll. Apart from photosynthesis, also photoperiodism, phototropism and photomorphogenesis are representative processes related to interaction between radiation and plants:
- photoperiodism refers to the ability that plants have to sense and measure the periodicity of radiation (e.g. to induce flowering),
- phototropism refers to the growth movement of the plant towards and away from the radiation, and
- photomorphogenesis refers to the change in form in response to the quality and quantity of radiation.

Two important absorption peaks of chlorophyll a and b are located in the red and blue regions, especially from 625-675 nm and from 425-475 nm, respectively. Additionally, there are also other localized peaks at near-UV (300-400 nm) and in the far-red region (700-800 nm). The main photosynthetic activity seems to take place within the wavelength range 400-700 nm. Radiation within this range is called photosynthetically active radiation (PAR).

In the context of horticulture lighting, near-UV is defined as one or more wavelengths selected from the spectral range of 300-400 nm, blue is defined as one or more wavelengths selected from the spectral range of 400-500 nm, white is defined is defined as wavelengths selected from the spectral range of 400-700 nm (which selected wavelengths together may constitute white light, such as a combination of wavelengths in the blue and green and red), green is defined as one or more wavelengths selected from the spectral range of 500-600 nm, red is defined as one or more wavelengths selected from the spectral range of 600-700 nm, deep-red is defined as one or more wavelengths selected from the spectral range of 640-700 nm, and far-red is defined as one or more wavelengths selected from the spectral range of 700-800 nm. Deep-red is thus a sub selection of red.

Other photo sensitive processes in plants include phytochromes. Phytochrome activity steers different responses such as leaf expansion, neighbor perception, shade avoidance, stem elongation, seed germination and flowering induction. The phytochrome photo system includes two forms of phytochromes, Pr and Pfr, which have their sensitivity peaks in the red at 660 nm and in the far-red at 730 nm, respectively.

In horticulture, the photosynthetic photon flux density (PPFD) is measured in number of photons per second per unit of area (in $\mu mol/sec/m^2$; a mol corresponding to $6 \cdot 10^{23}$ photons). In practice, when applying e.g. inter-lighting, especially for tomatoes, the red PPFD used may be typically 200 $\mu mol/sec/m^2$ and the ratio blue:red may be typically 1:7 (with red and blue especially selected from 625-675 nm and especially selected from 400-475 nm, respectively). Especially, the photosynthetic photon flux density may comprise about 10% blue and about 90% red. The PPFD can be determined from a photodiode or measured directly with a photomultiplier. The area in the PPFD refers to the local light receiving (plant) area of the space wherein the light source(s) are arranged. In case of a multi-layer system, it may be defined as the area of a relevant layer comprised in the multi-layer configuration; the PPFD may then be estimated in relation to each layer individually (see further also below). The area may be a value in an embodiment fed to the control unit manually, or may in an embodiment be evaluated (with e.g. sensors) by the control unit.

Plant growth depends not only on the amount of light but also on spectral composition, duration, and timing of the light on the plant. A combination of parameter values in terms of these aspects is called "light recipe" for growing the plant (herein, the words plant and crop can be interchanged).

LEDs can play a variety of roles in horticultural lighting such as:
1. Supplemental lighting: lighting that supplements the natural daylight is used in order to increase production (of tomatoes for example) or extend crop production during e.g. the autumn, winter, and spring period when crop prices may be higher.
2. Photoperiodic lighting: The daily duration of light is important for many plants. The ratio of the light and dark period in a 24 hour cycle influences the blossoming response of many plants. Manipulating this ratio by means of supplemental lighting enables regulating the time of blossoming.
3. Cultivation without daylight in plant factories.
4. Tissue culture.

For providing supplemental lighting during autumn, winter and spring in green-houses (or all-year round in multi-layer growth), in general high-power gas-discharge lamps are used that have to be mounted at a relative high location above the plants to ensure sufficiently uniform light distribution across the plants. At present, in green houses different types of high power lamps ranging from 600 up to 1000 W (e.g. high power HID) are used to provide plants with supplemental light. One drawback is that from the location above the plants the amount of light reaching the lower parts of the plant may be rather limited, dependent upon the type of crop. At the same time, the lower parts of the plant are often most in need of supplemental light. The same dilemma persists when using solid state lighting that is mounted above the plants. Nevertheless, LED lighting, especially solid state lighting, has some advantages over discharge based lighting.

In circumstances that plants get insufficient light from natural sunlight, e.g. in northern regions or in so-called "plant farming" or "vertical farming" that fully rely on artificial and well controlled conditions, there appears to be a need to provide light to the plant for growing (leaf and fruit), ripening and pre-harvest conditioning.

Light is not the only enabler for growth; also atmosphere (humidity level, $CO_2/O_2$ levels, etc.), water, nutrients and spore elements are of main importance. Temperature (and temperature profile/cycles over day/night) is also a key contributor to the success of growing plants. In the field of open air horticulture, it seems that there is a need for soilless or hydroponic horticulture, typically used for now in high profit/high value cultivation. Such methods are also based on non-natural growing of plants and could require or profit from artificial optimizations.

The space available for food production is becoming scarcer. Innovation in production methods is needed to deliver higher yields from smaller footprints, while becoming more sustainable (minimum use of energy and water). Producing food in closed environments such as plant farms is a method to meet these demands. In plant farms (also known as plant factories, vertical farms or city farms), food is grown in multiple layers, making much better use of the available space as compared to outdoor growth or growth in greenhouses. This implies that daylight will not be able to reach all plants and nearly all the light has to come from artificial lighting. In plant farms, there is a need for providing to the plants a light treatment that is optimal at all times. At the same time, it is imperative that the light that is generated by the LED modules is used as efficiently as possible in order to reduce energy consumption and result in a profitable business. In plant farms, the production per unit of area is much higher than the production in the open field. The use of water is minimized. Plant diseases and pests can be prevented more easily.

In horticulture, relatively much light, and thus energy, is used. Producing more yield while using less photons is the key for the future of horticulture.

The term "horticulture" relates to (intensive) plant cultivation for human use and is very diverse in its activities, incorporating plants for food (fruits, vegetables, mushrooms, culinary herbs) and non-food crops (flowers, trees and shrubs, turf-grass, hops, grapes, medicinal herbs). Horticulture is the branch of agriculture that deals with the art, science, technology, and business of growing plants. It may include the cultivation of medicinal plants, fruits, vegetables, nuts, seeds, herbs, sprouts, mushrooms, algae, flowers, seaweeds and non-food crops such as grass and ornamental trees and plants. Here, the term "plant" is used to refer essentially any species selected from medicinal plants, vegetables, herbs, sprouts, mushrooms, plants bearing nuts, plants bearing seeds, plants bearing flowers, plants bearing fruits, non-food crops such as grass and ornamental trees, etc.

Herein, the term "plant" is used for essentially all stages. The term "plant part" may refer to root, stem, leaf, fruit (if any), etc. The term "horticulture" relates to (intensive) plant cultivation for human use and is very diverse in its activities, incorporating plants for food (fruits, vegetables, mushrooms, culinary herbs) and non-food crops (flowers, trees and shrubs, turf-grass, hops, grapes, medicinal herbs). Horticulture is the branch of agriculture that deals with the art, science, technology, and business of growing plants. It may include the cultivation of medicinal plants, fruits, vegetables, nuts, seeds, herbs, sprouts, mushrooms, algae, flowers, seaweeds and non-food crops such as grass and ornamental trees and plants. Here, the term "plant" is used to refer essentially any species selected from medicinal plants, vegetables, herbs, sprouts, mushrooms, plants bearing nuts, plants bearing seeds, plants bearing flowers, plants bearing fruits, non-food crops such as grass and ornamental trees, etc. Even more especially, the term "plant" is used to refer essentially any species selected from medicinal plants, vegetables, herbs, sprouts, plants bearing nuts, plants bearing seeds, plants bearing flowers, plants bearing fruits, non-food crops.

The term "crop" is used herein to indicate the horticulture plant that is grown or was grown. Plants of the same kind grown on a large scale for food, clothing, etc., may be called crops. A crop is a non-animal species or variety that is grown to be harvested as e.g. food, livestock fodder, fuel, or for any other economic purpose. The term "crop" may also relate to a plurality of crops. Horticulture crops may especially refer to food crops (tomatoes, peppers, cucumbers and lettuce), as well as to plants (potentially) bearing such crops, such as a tomato plant, a pepper plant, a cucumber plant, etc. Horticulture may herein in general relate to e.g. crop and non-crop plants. Examples of crop plants are Rice, Wheat, Barley, Oats, Chickpea, Pea, Cowpea, Lentil, Green gram, Black gram, Soybean, Common bean, Moth bean, Linseed, Sesame, Khesari, Sunhemp, Chillies, Brinjal, Tomato, Cucumber, Okra, Peanut, Potato, Corn, Pearlmillet, Rye, Alfalfa, Radish, Cabbage, Lettuce, Pepper, Sunflower, Sugarbeet, Castor, Red clover, White clover, Safflower, Spinach, Onion, Garlic, Turnip, Squash, Muskmelon, Watermelon, Cucumber, Pumpkin, Kenaf, Oilpalm, Carrot, Coconut, Papaya, Sugarcane, Coffee, Cocoa, Tea, Apple, Pears, Peaches, Cherries, Grapes, Almond, Strawberries, Pine apple, Banana, Cashew, Irish, Cassava, Taro, Rubber, Sorghum, Cotton, Triticale, Pigeonpea, and Tobacco. Especial of interest are tomato, cucumber, pepper, lettuce, water melon, papaya, apple, pear, peach, cherry, grape, and strawberry.

The term "plant" herein may especially refer to Archaeplastida. The Archaeplastida are a major group of eukaryotes, comprising the red algae (Rhodophyta), the green algae, and the land plants, together with a small group of freshwater unicellular algae called glaucophytes. Hence, in embodiments the term "plant" may refer to land plants. In embodiments the term "plant" may (also) refer to algae (such as one or more of green algae and red algae and unicellular algae called glaucophytes).

Especially, the invention may be of interest for short day plants (rucola, baby leaf spinach, ornamental plant (such as anthuriums, orchids, chrysanthemum), essentially all herbs (such as dill, basil, parsley, coriander, Poinsettia) or any plants which photoperiod need to be kept short to avoid flower initiation (when this is particularly not wanted like in leafy vegetables). Further, the invention may especially be of interest for high wire plants, i.e. plants that grow along a wire or other vertical support. Hence, in embodiments the plant may be selected from the group of a tomato plant, a cucumber plant, a bell pepper plant, an aubergine plant, etcetera. In yet further, the plant comprises a plant selected from the group of leafy green plants.

The term "horticulture light" especially refers to light having one more wavelengths in on or more of a first wavelength region of 400-475 nm and a second wavelength region of 625-675 nm. The relative energies (watt) that are provided in these regions may depend upon the type of plant and/or the growth phase. Hence, a recipe may define the ratio, optionally as function of time, for one or more types of plants. Especially, the term "horticulture light may refer to the PAR region (the photosynthetically active region from 400-700 nm). The term "horticulture light" may also be used for light that is applied to plants in hydroponic applications. As known in the art, in the PAR region (the photo-synthetically active region from 400-700 nm) the reflection coefficient of leaves is very low (5-10%). Towards the near infrared, beyond 700 nm, the reflection coefficient increases. In specific embodiments, the horticulture light, may in addition to PAR light also include a small fraction (<20% of the power, especially about at maximum 10% of the power) far red, i.e. 700-800 nm.

The above applies to (artificial) horticulture light in general. In the present invention, amongst others specific horticulture light recipes are proposed.

When growing plant with LED lights in a totally closed environment, plants may grow significantly differently than outside. Several aspects such as temperature and humidity may interfere with the usual plant physiological development. But in addition, light spectrum may also have a morphological and physiological effect on the plant.

It appears that some plants, like lettuces, do grow well in a vertical farm. Also it appears that the usual absence of stress factors induced by sudden climate changes, light intensity variation and presence of UV light are favorable for a fast growth and biomass production.

In the segment category of cut leaves, baby leaves are cut several times from the plants. Plants are left in the growth area with the roots and few centimeters of stems and usually regrow rather fast. A large number of species are evolving between the first harvests to consecutive harvest. Leaves may changes shape, color and taste. In wild rucola, some users may particularly be interested in cut 5 or further because the leaves have a stronger taste and better appearance quality. Leaves have shown to change their composition and behavior cut after cut. One aspect which appears with increasing number of cut is bolting. Unfortunately, flowers are not sold as a product with the leaves and need to be sorted out and separated. They could, however, have a particular health benefit as they are edible and they are rather well flavored.

Bolting appears to strongly depend on light photoperiod. The longer the light hours per day the more the bolting occurs. It appeared that with cut rucola and spinach species, that were investigated, even with a short lighting photoperiod (12 h to max 15 h), depending on species, the bolting will still occur and flowers will pop up from (about) cut 3 on.

Hence, it is an aspect of the invention to provide an alternative system, lighting apparatus and/or method of growing a plant, which preferably further at least partly obviate(s) one or more of above-described drawbacks. The present invention may have as object to overcome or ameliorate at least one of the disadvantages of the prior art, or to provide a useful alternative. The invention is defined by the claims.

It appears that in general far red light induces flowering for most of the crops in horticulture, we have surprisingly found that a high dose of far red (such as at least about 10%) is significantly reducing bolting on cut rucola. However, a total absence of far red and/or a total absence of white light (presence of green) will induce bolting and increase the flowers production.

It further appears that a high level of far red increase the yield of the production. However, at the same time the shelf life is affected (negatively). Hence, a solution with a specific light recipe could be used to correct the (rucola) quality just before harvest while keeping the bolting occurrence low. In the present invention, we have elaborated several lighting recipe strategies in order to maximize the leaf quality, production and bolting reduction of especially baby leaf plants (that are known to bolt easily).

Therefore, in a first aspect there is described a method of providing horticulture light to a plant (in a horticulture arrangement), the method comprising providing during a controlling mode first horticulture light to the plant wherein especially at least 5% of the photons, even more especially at least 10%, such as yet even more especially at least 15%, of the photons of the first horticulture light have a wavelength selected from the range of 700-800 nm, wherein especially at least 20%, even more especially at least 40%, such as even yet more especially at least 45%, of the photons of the first horticulture light have a wavelength selected from the range of 640-700 nm, and wherein especially at maximum 10% of the photons of the first horticulture light have a wavelength selected from the range of 400-500 nm. Especially, the plant is configured in a horticulture arrangement.

With such method, it appears that bolting can be reduced and/or bolting can be delayed in the sense that the extent of bolting shifts to later cuts. Hence, with the method plants have a significant lower bolting which increases the partitioning in creating biomass for consumption. Using such light recipe that reduces bolting could (also) be a solution to increase production without increasing bolting. Especially, the application of far-red light appears to have a beneficial effect on the reduction of bolting. With the present method, also the investment costs in lamps and/or energy use may be reduced. In the present invention, growth light is provided with a substantial far-red component.

As indicated above, the invention provides a method of providing horticulture light to a plant. The plant can essentially be any plant as defined above. However, especially the plant is selected from the group of green vegetables. Further, especially the plant is of a type generating new leaves after harvesting of leaves. Further, especially the plant is of a type that can generate a bolt, or a plurality of bolts, and subsequently a flower, or a plurality of flowers, respectively. The term "bolting" and similar terms especially refer to the premature production of a flowering stem (or stems) on horticultural crops before the crop is at least partially harvested. The term "bolt" may thus refer to an early stage of a flower or flowering stem.

Even more especially, the plant is selected from the group of kale, spinach, Swiss chard, collard greens, purslane, mustard greens, watercress, rucola, lettuce, dandelion greens, cabbage, arugula, and beet greens. One or more types of the lettuce family or one or more types of the *brassica* family may be used in the present invention. The invention may also be applied for other types of plants that bolt, also those wherein there is no intentional substantial harvesting of leaves.

The term "plant" may also refer to a seed, or to a seedling. The term "plant" may thus in general refer to any of the stages from seed to (mature) plant. The term "plant" may also refer to a plurality of (different) plants.

The plant is especially configured in a horticulture arrangement. Especially, the term "horticulture arrangement" refers to a plant factory or climate cell, wherein the plants are grown under controlled conditions, and wherein the plants substantially do not receive day light. Further, such plant factory may be climatized, such as in the case of a climate cell. Hence, in embodiments the horticulture arrangement includes such plant factory or climate cell. Herein, the term plant factory is considered to encompass the embodiment of a climate cell.

In other embodiments, the plant factory or climate cell includes at least part of the horticulture arrangement. For instance, a climate cell may comprise the plant support and the lighting system, and the control system may be configured inside or external from the climate cell. In plant farms (also known as plant factories, vertical farms or city farms), food may be grown in multiple layers, making much better use of the available space as compared to outdoor growth or growth in greenhouses. This implies that daylight will not be able to reach all plants and nearly all the light has to come from artificial lighting. Hence, the invention especially refers to horticulture arrangements wherein the plants essentially only receive artificial light.

However, the invention is not limited to horticulture arrangements wherein the plants essentially only receive artificial light. Hence, the invention provides in a further aspect also a method wherein (supplemental) horticulture light is provided to a plant wherein the horticulture light is provided such that the minimum levels (and maximum levels) as defined herein for the far red range of 700-800 nm and the deep-red range of 640-700 nm are obtained (during the herein indicated time periods) by the plant. This may herein also be indicated as "supplemental controlling mode".

The method comprises providing during a controlling mode first horticulture light to the plant. The term "mode" may also be indicated as "controlling mode". The system, or apparatus, or device (see further also below) may execute an action in a "mode" or "operation mode" or "mode of operation". Likewise, in a method an action or stage, or step may be executed in a "mode" or "operation mode" or "mode of operation". This does not exclude that the system, or apparatus, or device may also be adapted for providing another controlling mode, or a plurality of other controlling modes. Likewise, this may not exclude that before executing the mode and/or after executing the mode one or more other modes may be executed. However, in embodiments a control system (see further also below) may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

The term horticulture light is also described above (in general). For the present method, the horticulture light during the control mode has a specific composition.

In specific embodiments, especially at least 5%, such as at least 10%, like at least 15%, even more especially at least 20% of the photons of the first horticulture light have a wavelength selected from the range of 700-800 nm. In specific embodiments, the contribution of the far-red light is not larger than 80%, such as not larger than 55%, like not larger than 35%, for instance, not larger than 30%.

Further, especially at least 20%, such as especially at least 30%, like at least 40%, such as even more especially at least 45% of the photons of the first horticulture light have a wavelength selected from the range of 640-700 nm. In specific embodiments, the contribution of the deep-red light is not larger than 95%, such as not larger than 90%, like not larger than 85%, such as not larger than 80%.

Yet further, especially at maximum 10%, such as at maximum 5%, of the photons of the first horticulture light have a wavelength selected from the range of 400-500 nm.

Therefore, in specific embodiments especially at least 5%, such as at least 10%, even more especially at least 15%, of the photons of the first horticulture light have a wavelength selected from the range of 700-800 nm, at least 40%, such as at least 45%, of the photons of the first horticulture light have a wavelength selected from the range of 640-700 nm, and at maximum 10% of the photons of the first horticulture light have a wavelength selected from the range of 400-500 nm. With such light, bolting can be controlled as described herein.

In specific embodiments, (i) at maximum 5% of the photons of the first horticulture light have a wavelength selected from the range of 400-500 nm, (ii) at maximum 45% of the photons of the first horticulture light have a wavelength selected from the range of 500-640 nm, (iii) at least 30%, such as at least 40%, even more especially at least 45%, of the photons of the first horticulture light have a wavelength selected from the range of 640-700 nm, and (iv) at least 10%, such as especially at least 15%, like at least 20%, of the photons of the first horticulture light have a wavelength selected from the range of 700-800 nm. Bolting can then even be better controlled (i.e. reduced), during at least a number of the first cuts. Hence, in embodiments at least 10%, such as at least 15%, like even at least about 20%, of the photons of the first horticulture light have a wavelength selected from the range of 700-800 nm.

The percentages of the photons relate to the total number of photons in the spectral range of 400-800 nm. Hence, e.g. the phrase "n % of the photons of the first horticulture light" and similar phrases indicate that out of all photons having a wavelength selected from the range of 400-800 nm (that is available in the horticulture light, especially provided by the horticulture lighting system) n/100 is in the specifically indicated subrange. This does not exclude that the horticulture light, such as may be provided by the herein described lighting apparatus provides also other radiation, such as UV radiation. However, for the herein described invention, the number of photons relate to the total number of photons in the 400-800 nm range. Further, the artificial light provided to the plant may essentially consist of the herein described first horticulture light, and essentially not include other types of radiation, unless indicated otherwise, such as in the embodiments that second horticulture light. In such (latter) embodiments, the artificial light provided to the plant may essentially consist of the herein described second horticulture light, and essentially not include other types of radiation (unless indicated otherwise). As indicated elsewhere, "essentially" may amongst others especially refer to at least 90%, such as at least 95%.

In specific embodiments, the at least 80%, such as at least 90%, such as even more especially at least 95% of the photons of the first horticulture light (in the wavelength range of 400-800 nm) have wavelengths selected from the range of 640-800 nm.

Further, especially the intensity of the light the plants receive is controlled within ranges. In specific embodiments, the method comprises providing during the controlling mode the first horticulture light with an average intensity (on the plant) selected from the range of at least 50 $\mu mol/m^2/s$, such as especially at least 100 $\mu mol/m^2/s$, like even more especially at least 150 $\mu mol/m^2/s$, such as especially selected from the range of 50-1000 $\mu mol/m^2/s$, even more especially selected from the range of 150-1000 $\mu mol/m^2/s$. In embodiments, the method comprises providing during the controlling mode the first horticulture light with an average intensity (on the plant) selected from the range of 200-1000. In embodiments, the intensity is not higher than 800 $\mu mol/m^2/s$, such as not higher than 600 $\mu mol/m^2/s$, like selected from the range of 200-600 $\mu mol/m^2/s$, such as especially 200-525 $\mu mol/m^2/s$.

Especially, the indicated light intensities are provided over a time period of 10-20 hours per day and with a dark period of 4-14 hours per day over a time period of 10-20 hours per day and with a dark period of 4-14 hours per day.

Hence, in specific embodiments, the method comprises providing during the controlling mode the first horticulture light with an average intensity selected from the range of at least 150 $\mu mol/m^2/s$, such as especially selected from the range of 200-100 $\mu mol/m^2/s$, like 200-525 $\mu mol/m^2/s$, over a time period of 10-20 hours per day and with a dark period of 4-14 hours per day over a time period of 10-20 hours per day and with a dark period of 4-14 hours per day.

The time period during the day over which the horticulture light in this mode is provided and the dark period, as well as the number of days the horticulture light is provided during the controlling mode may vary from plant (type) to plant (type). Further, the conditions can be chosen to speed up growth, to slow down growth, to influence the taste and or color of the leaves, etc. etc.

The value of at least 50 $\mu mol/m^2/s$, especially at least about 100 $\mu mol/m^2/s$, even more especially the value of at least about 150 $\mu mol/m^2/s$, such as at least about 200 $\mu mol/m^2/s$, with therein substantial portions in the (far) red and deep red (see the herein indicated percentages) is well above the compensation point of the plant (i.e. the photosynthesis process dominates over the respiration process).

As indicated above, the intensity, herein indicated as PPFD, can be determined from a photodiode or measured directly with a photomultiplier. The area in the PPFD especially refers to the local light receiving (plant) area of the space wherein the light source(s) are arranged. In case of a multi-layer system, it is the area of a relevant layer comprised in the multi-layer configuration; the PPFD may then be estimated in relation to each layer individually (see further also below). The area may be a value in an embodiment fed to the control unit manually, or may in an embodiment be evaluated (with e.g. sensors) by the control unit. The area ($m^2$) in phrases like "at least 150 $\mu mol/m^2/s$" and similar phrases may especially refer to a root growth medium face. The term "root growth medium face" may refer to the liquid level in hydroponic applications or it may refer to a top layer of a substrate, such as soil. For instance, it may refer to the "table level", i.e. the level on which the plant is configured. Especially, the phrase "at least 150 $\mu mol/m^2/s$" and similar phrases refers to the intensity that is received by the plant. Hence, any piece of the plant that can receive the light (i.e. especially at least those parts that are above the substrate) (in the horticulture system) receives such dose. For instance, the number of photons per second that are received per square meter at a top part of the plant and at a bottom part (but still accessible by the light) of the plant may be measured. The dose can then be calculated. For instance to avoid effects of shadow of leaves, one may use the root growth medium face. When the indicated intensity is received at the root growth medium face or table level (in the absence of plants), then the plant will also receive at least such intensity.

The conditions to which the (growing) plants are subjected are in general defined in a recipe. Hence, the control system may grow the plants according to a recipe. Such recipe may include a light recipe, which defines a predetermined (second) horticulture light intensity. This may imply that the recipe defines a predetermined (second) horticulture light intensity over time. Alternatively or additionally, the recipe may define a predetermined (second) horticulture light intensity as function of parameters that are sensed, like intake of nutrients, leaf size, plant temperature, leave temperature, root temperature, stem length, fruit size, etc. etc. Other parameters may also be sensed, such as one or more of temperature (in the greenhouse, farm, climate cell, tunnel, etc.), humidity, gas composition. Also the daylight intensity (would also solar light be applied) may be a parameter to be sensed. A recipe directed to lighting parameters may be indicated as "light recipe". A light recipe may be comprised by a recipe that also include other parameters, such as one or more of leave temperature, root temperature, ambient temperature, etc.

It appears that bolting is a problem that increases with the number of cuts. The larger the number of cuts, the more bolting can be a problem. It appears that for at least some of the plants, bolting may only be a problem after some cuts. Hence, it may only be necessary to apply the herein defined composition of the first horticulture light e.g. after some time the plant has grown or after some cuts, or e.g. may only be executed when the number of bolts or the size of the bolts exceed a respective predetermined minimum level. Therefore, in embodiments (wherein the plant is of a type generating new leaves after harvesting of leaves), the controlling mode comprises controlling the spectral composition of the first horticulture light as function of one or more of: (a) point of time within the life time of the plant, (b) number of harvests, (c) number and/or appearance of the bolts, and (d) number and/or appearance of flowers. The term "appearance" especially refer to one or more of size and color, especially at least size. As indicated above, bolting may lead to flowers.

Alternatively or additionally, the controlling mode comprises controlling the spectral composition of the first horticulture light as function of (i) number and/or appearance and/or color of leaves of one or more plants, (ii) area and/or color of a canopy of one or more plants, (iii) number of executed harvests after a first generation of leaves of one or more plants, (iv) number and/or appearance of bolts of one or more plants, and (v) number and/or appearance of flowers of one or more plants.

To this end, in embodiments a sensor may be applied. For instance, in embodiments a sensor may be applied for sensing one or more of: (i) number and/or appearance and/or color of leaves of one or more plants, (ii) area and/or color of a canopy of one or more plants, (iii) number of executed harvests after a first generation of leaves of one or more plants, (iv) number and/or appearance of bolts of one or more plants, and (v) number and/or appearance of flowers of one or more plants. The sensor may comprise a camera, such as a CCD camera. The term "sensor" may also refer to a plurality of sensors.

As the bolting may increase with the number of cuts, it may not only be an option to apply the horticulture light not always, but e.g. after a number of cuts, but alternatively or additionally, one may start with a relative low level of the essentially far red light (that appear to impose a reducing in the bolting behavior), one may start with a relatively low level, and increase this level e.g. after each cut. Therefore, in embodiments the controlling mode includes increasing a contribution of the photons having a wavelength selected from the range of 700-800 nm to the first horticulture light with one or more of: (a) time, (b) number of harvests, and (c) number and/or appearance of the bolts. Therefore, in specific embodiments the controlling mode comprises providing the first horticulture light only after an $n^{th}$ harvest, wherein n is at least 2, such as at least 3. Between two cuts, there will be in general a period of at least a week, such as at least two weeks, but in general less than a few months.

Further, it surprisingly appears that a pulse with essentially blue light, especially relatively shortly before a cut, may have a beneficial effect on increasing the yield (of the crops) and/or shelf life (of the cut leaves). Therefore, in embodiments preceding the harvest (the stage of) providing the first horticulture light is terminated and horticulture light relatively (more) rich in blue is provided. It appears that with the second horticulture light as part of the light recipe shelf live increases and the visual quality of the plant, especially the leaves, improves.

Hence, in specific embodiments the controlling mode includes providing the first horticulture light to the plant during one or more first time periods preceding a harvest and providing a second horticulture light to the plant during one or more second time periods preceding the harvest, wherein especially the first time periods and second time periods do not overlap (in time), wherein especially the one or more second time periods are within a period of at maximum three days preceding the harvest. In specific embodiments, at least 20% of the photons, such as at least 25%, like at least 30%, yet even more especially at least 35% of the photons of the second horticulture light have a wavelength selected from the range of 400-500 nm, and wherein at maximum 10% of the photons of the second horticulture light have a wavelength selected from the range of 700-800 nm. Especially, the second horticulture light has a higher (relative) intensity in the 400-500 nm range than the first horticulture light and a lower (relative) intensity in the 700-800 nm range. Even more especially, at least the absolute intensity (of the second horticulture light) in the 400-500 nm range is larger than the first horticulture light and also the absolute intensity (of the second horticulture light) in the 700-800 nm range is lower than the first horticulture light.

The intensity of the second horticulture light may be in similar ranges as indicated above.

Especially, also the second horticulture light is provided over a time period of 10-20 hours per day and with a dark period of 4-14 hours per day over a time period of 10-20 hours per day and with a dark period of 4-14 hours per day.

The method may especially be executed with the lighting apparatus as described herein and/or with the lighting system as described herein (which may comprise such lighting apparatus). The method may be run on a computer functionally coupled or comprised by the horticulture lighting system or horticulture arrangement.

Hence, in yet a further aspect, there is described a computer program product, when running on a computer which is functionally coupled to or comprised by a horticulture lighting apparatus configured to generate in a controlling mode first horticulture light wherein in specific embodiments at least 5%, such as at least 10%, such as especially at least 15%, of the photons of the first horticulture light have a wavelength selected from the range of 700-800 nm, wherein at least 20%, such as at least 40%, like especially at least 45%, of the photons of the first horticulture light have a wavelength selected from the range of 640-700 nm, and wherein at maximum 10% of the photons of the first horticulture light have a wavelength selected from the range of 400-500 nm, is especially capable of bringing about the method as described herein. The horticulture lighting apparatus is especially the horticulture lighting system as further defined herein.

Therefore, the invention further provides a computer program product enabled to carry out the method as defined herein, for instance when loaded on a computer (that is functionally coupled to the horticulture lighting system or horticulture lighting apparatus). In yet a further aspect, the invention provides a record carrier (or data carrier, such as a USB stick, a CD, DVD, etc.) storing a computer program according to claim. Hence, the computer program product, when running on a computer or loaded into a computer, brings about, or is capable of bringing about, the method as described herein. Therefore, in a further aspect the invention provides a computer program product, when running on a computer which is functionally coupled to or comprised by a horticulture lighting system, especially as defined herein, or a horticulture arrangement, especially as defined herein, (and thus) comprising such horticulture lighting system, is capable of bringing about the method as described herein.

The record carrier or computer readable medium and/or memory may be any recordable medium (e.g., RAM, ROM, removable memory, CD-ROM, hard drives, DVD, floppy disks or memory cards) or may be a transmission medium (e.g., a network comprising fiber-optics, the world-wide web, cables, and/or a wireless channel using, for example, time-division multiple access, code-division multiple access, or other wireless communication systems). Any medium known or developed that can store information suitable for use with a computer system may be used as the computer-readable medium and/or memory. Additional memories may also be used. The memory may be a long-term, short-term, or a combination of long-and-short term memories. The term memory may also refer to memories. The memory may configure the processor/controller to implement the methods, operational acts, and functions disclosed herein. The memory may be distributed or local and the processor, where additional processors may be provided, may be distributed or singular. The memory may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network, such as the Internet, is still within memory, for instance, because the processor may retrieve the information from the network.

The controller/processor and the memory may be any type. The processor may be capable of performing the various described operations and executing instructions stored in the memory. The processor may be an application-specific or general-use integrated circuit(s). Further, the processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi-purpose integrated circuit.

The invention also provides a computer program product, which, when running on a computer which is functionally coupled to or comprised by a horticulture lighting system (or horticulture lighting apparatus), is configured to generate in a controlling mode supplemental horticulture light (i.e. the supplemental controlling mode), wherein the horticulture light is provided such that the minimum levels (and maximum levels) as defined herein for the far red range of 700-800 nm and the deep-red range of 640-700 nm are obtained (during the herein indicated time periods) by the plant.

In yet a further aspect, there is described a horticulture lighting apparatus ("lighting apparatus" or "apparatus") that may be (solely) configured or that may be able to generate the first horticulture light. Hence, in an aspect the invention provides a lighting apparatus configured to provide during a controlling mode first horticulture light wherein at least 5%, even more especially at least 10%, such as even more especially at least 15%, like at least 20%, of the photons of the first horticulture light have a wavelength selected from the range of 700-800 nm, wherein at least 20%, such as at least 40%, like especially at least 45%, of the photons of the first horticulture light have a wavelength selected from the range of 640-700 nm, and wherein at maximum 10% of the photons of the first horticulture light have a wavelength selected from the range of 400-500 nm. As indicated above, the terms "controlling mode" or "operation mode" or similar terms may in embodiments refer to an apparatus, that can only operate in a single operation mode (i.e. "on", without further tunability). However, the terms "controlling mode" or "operation mode" or similar terms may also refer to an apparatus that may also be adapted for providing another controlling mode, or a plurality of other controlling modes.

Hence, the lighting apparatus may be configured to provide lighting apparatus light, such as horticulture light, with in specific embodiments a controllable spectral power distribution, wherein in a controlling mode (of the apparatus) the first horticulture light is provided, but wherein in specific embodiments the lighting apparatus may also be able to provide horticulture light having a spectral power distribution different from the first horticulture light. In alternative embodiments, the lighting apparatus is especially configured to provide the first horticulture light, and basically include a single controlling mode, i.e. the generation of first horticulture light during an on-mode, optionally at controllable intensities, but essentially at all intensities the same spectral distributions, or no generation of first horticulture light during an off-mode. The term "horticulture light" refers to horticulture light in general (see also above); the terms "first horticulture light" or "second horticulture light" especially refer to light having a specific spectral composition as indicated herein.

Hence, in embodiments the lighting apparatus comprises a lighting control system or may be functionally coupled to a lighting control system that is configured to control the spectral properties of the lighting apparatus. In embodiments, this may be the control system as further defined in relation to the horticulture lighting system.

In yet other embodiments, the lighting apparatus is configured to provide essentially a single spectral distribution, i.e. the spectral distribution of the first horticulture light.

The lighting apparatus comprises a light source for providing the horticulture light, such as at least the horticulture light. The lighting apparatus may comprise a device, with a device housing, wherein the device housing comprises the light source.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of light sources, such as 2-2000 solid state light sources.

Blue light may especially be provided with a blue light source, such as especially a blue LED, though optionally a UV light source, such as especially a UV LED with blue luminescent material may be chosen.

Green light may especially be provided with a green light source, especially a green LED, though also a blue light source, especially a blue LED, or a UV light source, especially a UV LED, with green luminescent material may be chosen.

Red light may especially be provided with a red light source, especially a red LED, though optionally a UV light source, especially UV LED, or a blue light source, especially a blue LED, with red luminescent material may be chosen. Likewise, this may apply to far-red and deep-red.

Especially, the lighting apparatus comprises a plurality of light sources for providing the horticulture light, such as at least the first horticulture light. Two or more light sources, or all light sources together, may be configured to provide in the controlling mode the first horticulture light. Hence, especially the lighting apparatus comprises a plurality of different light sources for providing the horticulture light, such as at least the first horticulture light and optionally the second horticulture light.

In embodiments, the lighting apparatus may comprise a plurality of light sources, especially solid state light sources. In further embodiments, two or more subsets of these light sources may independently controllable. Yet further, two or more of (such) subsets may provide light with different spectral distributions. In such embodiments, intensity and spectral distribution of the horticulture light, such as of the first horticulture light and/or the second horticulture light may be controllable. Hence, the two or more subsets may in embodiments be configured to provide light with different spectral distributions.

Hence, in embodiments the horticulture lighting apparatus may comprise (i) a first set of one or more light sources, especially solid state light sources, configured to provide light having a wavelength selected from the range of 700-800 nm, (ii) a second set of one or more light sources, especially solid state light sources, configured to provide light having a wavelength selected from the range of 640-

700 nm, and may optionally comprise (iii) a third set of light sources, especially one or more solid state light sources, configured to provide light having a peak wavelength selected from the range of 400-500 nm. More types of light sources may also be available.

Especially, the different types of light provided herein are provided with light sources having a peak wavelength in the herein indicated wavelength ranges (belonging to the different types of light). Therefore, in specific embodiments the horticulture lighting apparatus comprises (i) a first set of one or more (solid state) light sources configured to provide light having a peak wavelength selected from the range of 700-800 nm, (ii) a second set of one or more (solid state) light sources configured to provide light having a peak wavelength selected from the range of 640-700 nm, and optionally (iii) a third set of one or more (solid state) light sources configured to provide light having a peak wavelength selected from the range of 400-500 nm. More types of light sources may also be available.

Further, in specific embodiments the horticulture lighting apparatus is configured to provide (during the controlling mode) the first horticulture light with an average intensity selected from the range of at least 50 $\mu mol/m^2/s$, such as especially at least 100 $\mu mol/m^2/s$ at a distance from the lighting apparatus of at least 30 cm, such as at least 100 cm. As the apparatus may comprise a plurality of light sources providing the (first) horticulture light at spatially different positions, the intensity of the light may not differ much between 30 and 100 cm distance from the lighting apparatus.

Especially, the apparatus is configured to provide the (first) horticulture light with the above (in relation to the method) defined intensities, especially at at least 30 cm from the horticulture lighting apparatus. Further, the horticulture lighting apparatus may be configured to provide the (first) horticulture light with the above (in relation to the method) defined intensities during the above (in relation to the method) defined time periods (i.e. hours per day).

The invention also provides a (horticulture) lighting apparatus that is configured to generate in a controlling mode supplemental horticulture light (i.e. the supplemental controlling mode), wherein the horticulture light is provided such that the minimum levels (and maximum levels) as defined herein for the far red range of 700-800 nm and the deep-red range of 640-700 nm are obtained (during the herein indicated time periods) by the plant.

The term "lighting apparatus" may also refer to a plurality of (different) lighting apparatus. Two or more of these may together provide the horticulture light, such as the first horticulture light and/or optionally the second horticulture light.

Basically the same embodiments as described in relation to the method may also apply to the (horticulture) lighting apparatus.

The lighting apparatus may especially be used in the herein described method and/or in the herein described horticulture lighting system.

In yet a further aspect there is described a horticulture lighting system, comprising:
  a lighting apparatus configured to provide horticulture light, especially configured to provide horticulture light with a controllable spectral power distribution;
  a control system configured to control the lighting apparatus to provide during a controlling mode first horticulture light wherein in specific embodiments at least 5%, such as especially at least 10%, like even more especially at least 15% of the photons of the first horticulture light have a wavelength selected from the range of 700-800 nm, wherein at least 20%, such as especially at least 40%, like even more especially at least 45% of the photons of the first horticulture light have a wavelength selected from the range of 640-700 nm, and wherein at maximum 10% of the photons of the first horticulture light have a wavelength selected from the range of 400-500 nm.

With such system, the horticulture lighting that is provided to the plant, can be controlled. In this way, bolting can be reduced and yield and/or shelf life may be increased.

The term "controlling" and similar terms especially refer at least to determining the behavior or supervising the running of an element (here the horticulture system or one or more elements thereof). Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element.

The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

Examples of user interface devices include a manually actuated button, a display, a touch screen, a keypad, a voice activated input device, an audio output, an indicator (e.g., lights), a switch, a knob, a modem, and a networking card, among others. Especially, the user interface device may be configured to allow a user instructing the device or apparatus or system, with which the user interface is functionally coupled or by with the user interface is functionally comprised. The user interface may especially include a manually actuated button, a touch screen, a keypad, a voice activated input device, a switch, a knob, etc., and/or optionally a modem, and a networking card, etc. The user interface may comprise a graphical user interface. The term "user interface" may also refer to a remote user interface, such as a remote control. A remote control may be a separate dedicate device. However, a remote control may also be a device with an App configured to (at least) control the system or device or apparatus. A user interface is especially functionally coupled to a control system or may be comprised by a control system.

Basically the same embodiments as described in relation to the method may also apply to the horticulture lighting system. Some embodiments are discussed in more detail below.

In specific embodiments, the control system may be configured to control the lighting apparatus to provide during the controlling mode first horticulture light over a time period of 10-20 hours per day and to provide a dark period of 4-14 hours per day. Especially, first horticulture light comprises at maximum 5% of the photons of the first horticulture light have a wavelength selected from the range of 400-500 nm, at maximum 45% of the photons of the first horticulture light have a wavelength selected from the range of 500-640 nm, at least 20%, such as especially at least 40%, like even more especially at least 45% of the photons of the first horticulture light have a wavelength selected from the range of 640-700 nm, and at least 5%, such as especially at least 10%, like even more especially at least 15%, such as at least 20%, of the photons of the first horticulture light have a wavelength selected from the range of 700-800 nm. In yet further specific embodiments (as also indicated above), the controlling mode comprises controlling the spectral composition of the first horticulture light as function of one or more of: (a) point of time within the life time of the plant, (b) number of harvests, (c) number and/or appearance of bolts, and (d) number and/or appearance of flowers.

In yet further specific embodiments (as also indicated above), the horticulture lighting system may further comprises a sensor, wherein the control system is configured to sense via the sensor one or more of: (a) number and/or appearance and/or color of leaves of one or more plants, (b) area and/or color of a canopy of one or more plants, (c) number of executed harvests after a first generation of leaves of one or more plants, (d) number and/or appearance of bolts of one or more plants, and (e) number and/or appearance of flowers.

The phrase "number of executed harvests after a first generation of leaves" especially refers to the number of harvests per se. As indicated above, in embodiments the controlling mode comprises providing the first horticulture light only after an $n^{th}$ harvest, wherein n is at least 2.

In embodiments, the controlling mode includes increasing a contribution of the photons having a wavelength selected from the range of 700-800 nm to the first horticulture light with one or more of: (a) time, (b) number of harvests, (c) number and/or appearance of the bolts, and (d) number and/or appearance of flowers. Further, in embodiments the controlling mode includes providing the first horticulture light to the plant during one or more first time periods preceding a harvest and providing a second horticulture light to the plant during one or more second time periods preceding the harvest, wherein the first time periods and second time periods do not overlap, wherein the one or more second time periods are within a period of at maximum three days preceding the harvest, wherein at least 20% of the photons of the second horticulture light have a wavelength selected from the range of 400-500 nm, and wherein at maximum 10% of the photons of the second horticulture light have a wavelength selected from the range of 700-800 nm.

As indicated above, especially the horticulture lighting system may comprise the lighting apparatus (such as especially as defined herein). Yet further, the horticulture lighting system may comprise a plurality of (different) lighting apparatus (such as especially as defined herein). A plurality of different apparatus may together provide the (first and/or second) horticulture light.

Especially, the horticulture lighting system comprises a plurality of light sources for providing the horticulture light, such as at least the horticulture light. Two or more light sources, or all light sources together, may be configured to provide in the controlling mode the first horticulture light.

In embodiments, the horticulture lighting system may comprise a plurality of light sources, such as especially solid state light sources. In further embodiments, two or more subsets of these light sources may independently controllable. Yet further, two or more of (such) subsets may provide light with different spectral distributions. In such embodiments, intensity and spectral distribution of the horticulture light, such as of the first horticulture light and/or the second horticulture light may be controllable.

Hence, in embodiments the horticulture lighting system comprises (i) a first set of one or more light sources, such as solid state light sources, configured to provide light having a wavelength selected from the range of 700-800 nm, (ii) a second set of one or more light sources, such as solid state light sources, configured to provide light having a wavelength selected from the range of 640-700 nm, and optionally comprising (iii) a third set of one or more light sources, such as solid state light sources, configured to provide light having a peak wavelength selected from the range of 400-500 nm. More types of light sources may also be available.

Especially, the different types of light provided herein are provided with light sources having a peak wavelength in the herein indicated wavelength ranges (belonging to the different types of light). Therefore, in specific embodiments the horticulture lighting system comprises (i) a first set of one or more (solid state) light sources configured to provide light having a peak wavelength selected from the range of 700-800 nm, (ii) a second set of one or more (solid state) light sources configured to provide light having a peak wavelength selected from the range of 640-700 nm, and optionally comprising (iii) a third set of one or more (solid state) light sources configured to provide light having a peak wavelength selected from the range of 400-500 nm. More types of light sources may also be available.

In embodiments, a light source configured to provide light having a wavelength selected from the range of 700-800 nm, is especially a light source of which at least 50%, such as especially at least 70%, like at least 80%, such as even at least 90% of the power in the spectral range of 400-800 nm is in the range of 700-800 nm. In embodiments, the light source is a light source that is configured to generate light source light having peak wavelength in the indicated wavelength range, i.e. the peak maximum in the 400-800 nm range is in the 700-800 nm range.

Yet, in embodiments a light source configured to provide light having a wavelength selected from the range of 640-700 nm, is especially a light source of which at least 50%, such as especially at least 70%, like at least 80%, such as even at least 90% of the power in the spectral range of 400-800 nm is in the range of 640-700 nm. In embodiments, the light source is a light source that is configured to generate light source light having peak wavelength in the indicated wavelength range, i.e. the peak maximum in the 400-800 nm range is in the 640-700 nm range.

Further, in embodiments a light source configured to provide light having a wavelength selected from the range of 400-500 nm, is especially a light source of which at least 50%, such as especially at least 70%, like at least 80%, such as even at least 90% of the power in the spectral range of 400-800 nm is in the range of 400-500 nm. In embodiments, the light source is a light source that is configured to generate light source light having peak wavelength in the indicated wavelength range, i.e. the peak maximum in the 400-800 nm range is in the 400-500 nm range.

Also, in embodiments a light source configured to provide light having a wavelength selected from the range of 500-640 nm, is especially a light source of which at least 50%, such as especially at least 70%, like at least 80%, such as even at least 90% of the power in the spectral range of 400-800 nm is in the range of 500-640 nm. In embodiments, the light source is a light source that is configured to generate light source light having peak wavelength in the indicated wavelength range, i.e. the peak maximum in the 400-800 nm range is in the 500-640 nm range.

A light source configured to generate white light is especially a light source of which the light that is emitted is white light, as known to the person skilled in the art. It especially relates to light having a correlated color temperature (CCT) between about 2000 and 20000 K, especially 2700-20000 K, and especially within about 15 SDCM (standard deviation of color matching) from the BBL (black body locus), especially within about 10 SDCM from the BBL, even more especially within about 5 SDCM from the BBL.

Further, in specific embodiments the horticulture lighting system is configured to provide (during the controlling mode) the first horticulture light with an average intensity selected from the range of at least 50 µmol/m²/s, such as especially at least 100 µmol/m²/s at a distance from the horticulture lighting system of at least 30 cm, such as at least 100 cm. As the system may comprise a plurality of light sources providing the (first) horticulture light at spatially different positions, which may extend over meters, or even dozens of meters, the intensity of the light may not differ much between 30 and 100 cm distance from the horticulture lighting system.

Especially, the apparatus is configured to provide the (first) horticulture light with the above (in relation to the method) defined intensities, especially at at least 30 cm from the horticulture lighting apparatus. Further, the horticulture lighting apparatus may be configured to provide the (first) horticulture light with the above (in relation to the method) defined intensities during the above (in relation to the method) defined time periods (i.e. hours per day).

The invention also provides a horticulture lighting system that is configured to generate in a controlling mode supplemental horticulture light (i.e. the supplemental controlling mode), wherein the horticulture light is provided such that the minimum levels (and maximum levels) as defined herein for the far red range of 700-800 nm and the deep-red range of 640-700 nm are obtained (during the herein indicated time periods) by the plant.

In yet a further aspect, the invention also provides a horticulture arrangement for plants, the horticulture arrangement comprising a horticulture lighting system as defined herein; and a support for support of the plants.

In use, the arrangement may include a plant support with a plant, or a plant support with a seed, or a plant support with a seedling, etc. Hence, in use the system (comprising the arrangement) may include a plant support with a plant, or a plant support with a seed, or a plant support with a seedling, etc. The terms "support" or "plant support" may refer to one or more of (particulate) substrate, aqueous substrate (in hydroponics), soil, wire (for wire crops), etc., which can be used to grow plants in, on, or along, etc.

The control system of such horticulture arrangement may control one or more of temperature, humidity, irrigation, nutrient supply, light intensity of the horticulture light, air conditions including one or more of air temperature, air composition, air flow, etc. Such horticulture system may be configured to control one or more of these conditions at different locations in the arrangement.

As can also be derived from the above, in specific embodiments the horticulture lighting system and/or the horticulture arrangement may further comprising a sensor, wherein the sensor is configured to monitor a parameter of a plant and/or other parameters, and to provide a corresponding sensor signal, and wherein the control system is configured to horticulture lighting system and/or the horticulture arrangement in dependence of such sensor signal.

For instance, for the supplemental controlling mode, a light sensor may be applied, wherein the control system in dependence of a sensor signal of the light sensor controls the supplemental horticulture light such that the minimum levels (and maximum levels) as defined herein for the far red range of 700-800 nm and the deep-red range of 640-700 nm are obtained (during the herein indicated time periods) by the plant.

Hence, the horticulture lighting apparatus or the horticulture lighting system may further include a light sensor, configured to sense ambient light. On the basis of the light sensor signal, the supplemental light may be provided.

In general, the first horticulture light may also be provided in dependence of a light sensor. Based on a feedback signal of the sensor, the (predetermined) spectral distribution and/or spectral power may be provided. As indicated herein, the term "sensor" and similar terms (like "light sensor") may also refer to a plurality of (different) sensors (such as light sensors. Especially a horticulture light system or a horticulture arrangement may include a plurality of (spatially separated) light sensors (and/or other sensors).

The phrase "minimum levels (and maximum levels)" and similar phrases especially refers to the percentage of the respective type of light (blue, deep red, far red, etc.) of the light and/or the intensity (i.e. especially the photosynthetic photon flux density (PPFD)).

BRIEF DESCRIPTION OF THE DRAWINGS

Embodiments will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
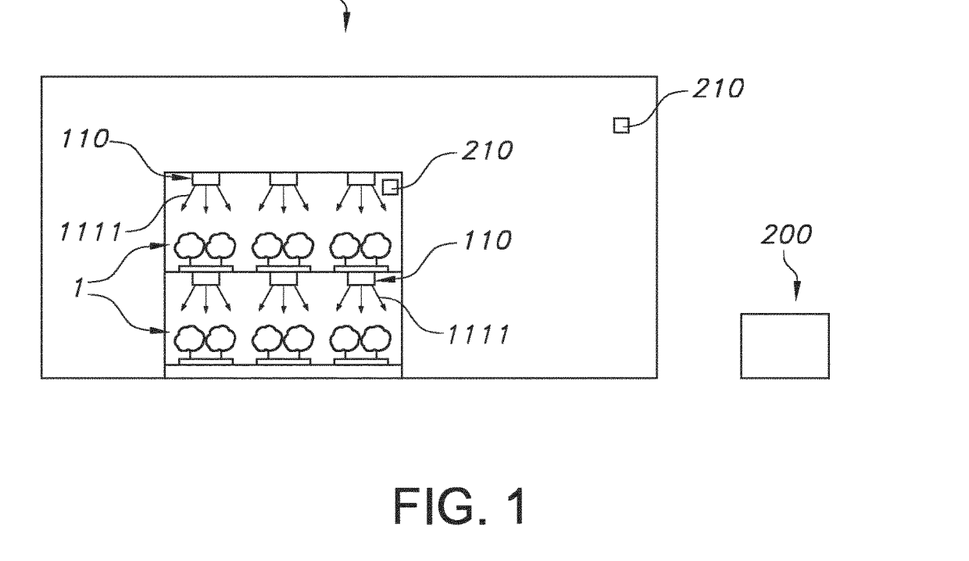
FIG. 1 schematically depicts an embodiment and variants of the horticulture arrangement, the horticulture system, and the lighting apparatus.

In plant farms (see: FIG. 1), the production per unit of area is much higher than the production in the open field. The use of water is minimized. Plant diseases and pests can be prevented more easily. Typically, in a plant farm, plants are grown in climate cells. Each cell is equipped with one or more racks. Each rack has multiple layers for growing plants. The plants (herbs such as basil or leafy vegetables such as lettuce) can also be grown hydroponically (the plants are grown without soil, using mineral or organic nutrients dissolved in water). Alternatively, as shown hear, the plants may be grown in substrate such as soil or particulate material.

Amongst others, FIG. 1 schematically shows a lighting apparatus 110 configured to provide during a controlling mode first horticulture light 1111. As indicated above, at least 5% of the photons of the first horticulture light 1111 have a wavelength selected from the range of 700-800 nm, wherein at least 45% of the photons of the first horticulture light 1111 have a wavelength selected from the range of 640-700 nm, and wherein at maximum 10% of the photons of the first horticulture light 1111 have a wavelength selected from the range of 400-500 nm.

The lighting apparatus 110 may in embodiments also be configured to provide other types of horticulture light. Hence, the lighting apparatus 110 may be configured to provide horticulture light with a controllable spectral distribution, wherein a control system can control this spectral distribution, such that in a controlling mode the first horticulture light is generated. Alternatively, the lighting apparatus may only be configured to provide the first horticulture light.

The lighting apparatus may include a plurality of light sources.

FIG. 1 also schematically depicts a horticulture lighting system 100, comprising a lighting apparatus 110 configured to provide horticulture light, which may in embodiments have a controllable spectral light distribution, but is at least configured to provide the first horticulture light. The horticulture lighting system 100 also includes a control system 200 configured to control the lighting apparatus 110 to provide during a controlling mode the first horticulture light 1111

As indicated above, the controlling mode comprises controlling the spectral composition of the first horticulture light 1111 as function of one or more of: a point of time within the life time of the plant 1, b number of harvests, and c number and/or appearance of bolts. Hence, in embodiments the horticulture lighting system 100 may further comprise a sensor 210. Here, by way of example two sensors 210 are depicted, which may have different functions. For instance, one may be configured to sense one or more of temperature, humidity, etc. However, at least a sensor 210 may be configured to sense the plants, such as a CCD camera. Hence, the control system 200 may especially be configured to sense via the sensor 210 one or more of: (a) number and/or appearance and/or color of leaves of one or more plants, (b) area and/or color of a canopy of one or more plants, (c) number of executed harvests after a first generation of leaves of one or more plants, (d) number and/or appearance of bolts of one or more plants, and (e) number and/or appearance of the flowers of one or more plants.

FIG. 1 also schematically depicts a horticulture arrangement 1000 for plants 1, the horticulture arrangement 100 comprising a horticulture lighting system 100 according to any one of the preceding claims; and a support 400 for support of the plants 1.

Figure 2:
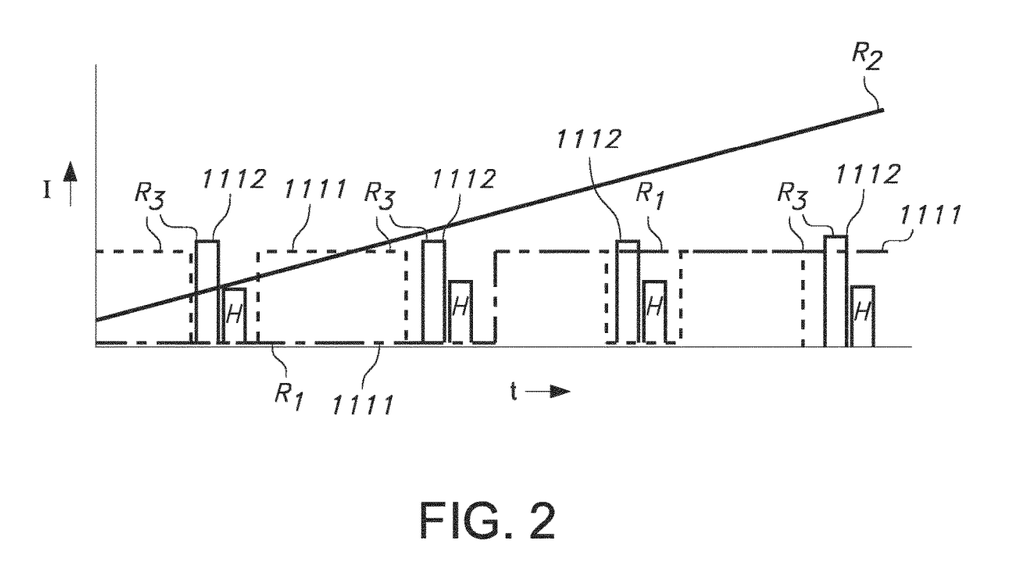
FIG. 2 schematically depicts embodiments of light recipes.

FIG. 2 schematically depicts three light recipes that may be used. More recipes than depicted can be used. On the x-axis, the time is depicted. The bars indicated with H are harvest moments or harvest periods. On the y-axis the intensity is indicated, though this is only an indicated. The relative intensities between the three light recipes have no meaning.

A first recipe R1 shows that the first horticulture light 1111 is only provided after the second harvest. This may also be the third, or optionally the fourth harvest. By way of example, thereafter only a single intensity first horticulture light 1111. However, this intensity may also vary, such as according to recipe R2 and/or recipe R3.

Recipe R2 shows a continuous increase of the first horticulture light 1111 over time. This intensity may start when the seedling is available. However, this intensity of the first horticulture light may also only start after the $n^{th}$ harvest, like for recipe R1.

Recipe R3 shows that shortly before the harvest a pulse, e.g. during a few days before harvest (during lighting times, which may be shorter than 24 h a day) of second horticulture light 1112 is provided, whereas the intensity of the first horticulture light 1111 is then basically zero, at least much smaller than of the second horticulture light 1112.

As indicated above, more recipes are possible, such as combinations of two or more of the afore-mentioned recipes.

Hence, light recipes are proposed that can significantly reduce bolting. It may however be impossible to totally eliminate bolting, but the incidence of bolting on harvest will occur at a later stage (later cuts) such that more harvest are possible.

Several experiments with various lighting recipes were done wherein bolting and yield were measured. Bolting and bolting reduction was observed on several wild rucola types (*Diplotaxi tenuifolia*).

The plant density was 1250 plants per $m^2$. The light treatments consisted of a standard deep-red/blue recipe with 247 $\mu$mol $m^{-2}$ $s^{-1}$ PAR, with 5% far-red (DRB), a standard Philips deep-red/white recipe at 347 $\mu$mol $m^{-2}$ $s^{-1}$ PAR light with either low (5%, DRW) or high (25%, HFR) far-red light on top of that, and a deep-red/white recipe with 260 $\mu$mol $m^{-2}$ $s^{-1}$ with 25% far-red on top (DRI). Six trays were available per light treatment of which half could be used to experiment with various continuous pre-harvest light treatments, leaving 3 trays for control and 3 trays for pre-harvest treatments (dynamic light treatments).

The below table give some information on the different light compositions used:

| | Blue (%) | Deep-red (%) | White (%)[1] | Far red (%) |
|---|---|---|---|---|
| DRW | 5-10 | 55-65 | 20-30 | 5-10 |
| DRB | 30-40 | 55-65 | 0 | <5 |
| DRI | 5 | 55-65 | 10-20 | 15-25 |
| HFR | 5-10 | 45-55 | 10-30 | 20-30 |

[1]blue part of the white part is in a separate column)

In cut 1, 5 trays were used in the control treatment and only 1 tray was used for pre-harvest treatments. In cut 2 till 7, 3 trays were used in the control treatment and 3 trays were used for pre-harvest treatments. In cut 8, 3 trays were used in the control treatment and no pre-harvest treatment was applied.

New measurements in this harvest were bolting and overall visual quality (OVQ) assessments. Bolting was measured by counting flower-stems, and weighing them separately from the leaves. OVQ was assessed by storing 3 boxes with 50 g at 4° C. and 10° C. Plant material was scored in a 1-10 range with 1 as lowest and 10 as highest possible soccer, 6 was the minimum for a sellable product.

Results in Figs. are expressed as a function of number (days after sowing). The x-as thus indicates the time in number of days after sowing.

Figure 3A:
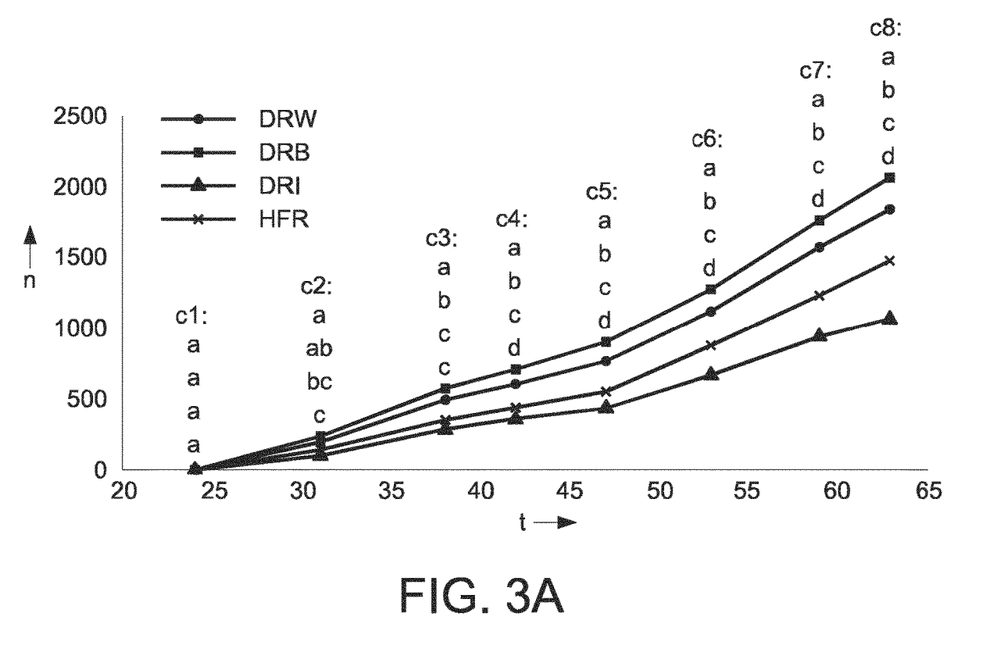
FIGS. 3a-c show some experimental results.

Overall, it appears that blue light, low far-red and high PAR induce bolting ($P<0.05$; FIG. 3a). The treatment with lowest PAR light level showed the lowest bolting. Figure showing the bolting evolution as a function of number of cuts and DAS of wild rucola grown under four different static lighting recipes. Low bolting is achieved for low light level and high far red levels (or high proportion of far red compared to PAR).

DRW and DRB both have a relative low far-red amount and give relative high bolting, though the DRB, with less than 5% far-red and a large blue amount is clearly worst. Where white is reduced, blue is kept low, and the far-red content is increased, as in the cases of DRI and HFR, the bolting is clearly reduced. The DRI recipe is the best, with relative to the HFR recipe has a lower blue content, a higher deep-red content, a lower white content and a slightly higher far-red content. The more blue light the more bolting (DRB has 35% of blue).

Yield appears to be systematically higher with 25% far red compared to 5% far red. Towards the end of the cuts, differences are bigger. This is due to both having less bolting and generating more biomass with far red. High level of blue light lowers the yield.

It was observed that high additional far red has the lowest efficiency because in that light recipe, more photons are used (total light sum visible+far red).

Figure 3B:
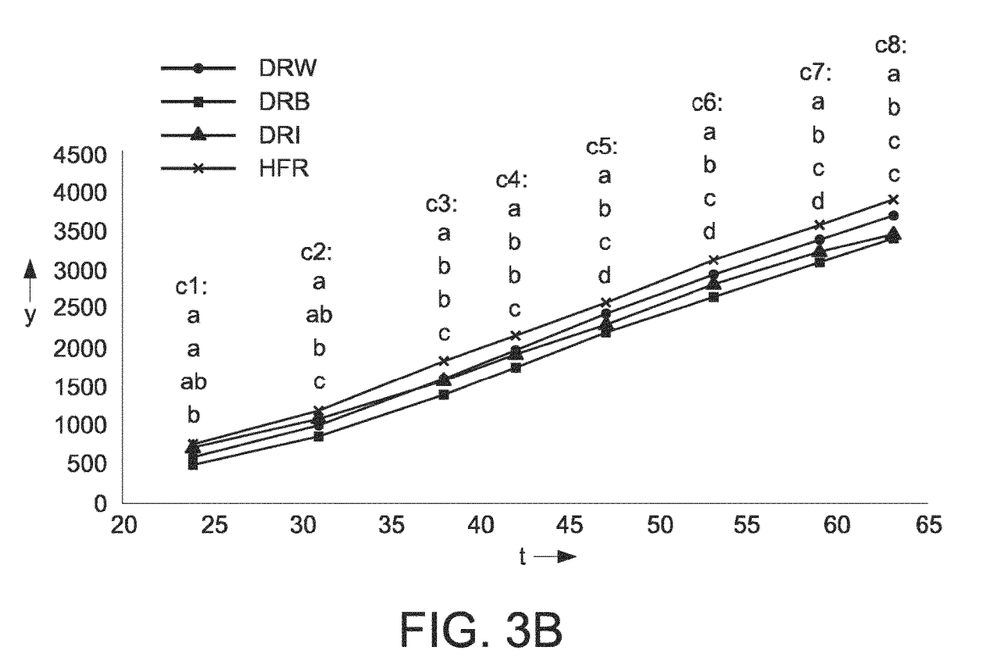
Figure 3C:
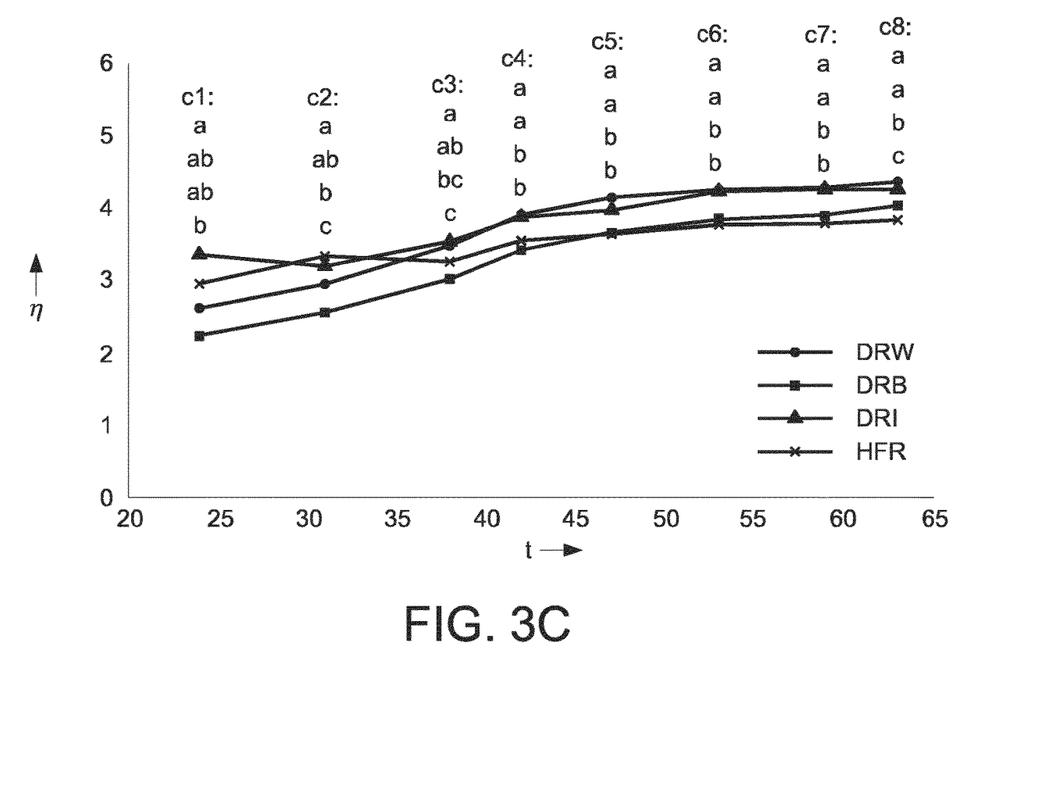

FIG. 3a shows on the y-axis the number n of bolting defined as the number of flower stems per square meter. FIG. 3b shows the yield or the cumulative yield in $g/m^2$. The cumulative yield is defined as weight per square meter. FIG. 3c shows on the y-axis the radiation use efficiency in g/mol, i.e. the mass of the yield per mol photons of the horticulture light.

Also alternative light recipes were tested.

As a first simple light recipe, high level of far red (25%) has been shown to represent a strong reduction on bolting. This could be combined best with deep red white light but could also be used with deep red blue, however white containing green compound seems also to have a similar (but less strong) effect on bolting.

In a second example, a dynamic light recipe to reduce bolting is applied. Bolting appears only at cut 3 and is really becoming a problem at cut 5 and above. Therefore a dynamic light recipe is proposed to gradually increase the Far red light percentage as a function of number of cuts. For example this light recipe would fit well the wild rucola: 5% far red for cut 1-2, 10% far red for cut 3, 15% far red for cut 4 etc. . . . . . See e.g. example R1 in FIG. 2.

In a third example, a dynamic light recipe to reduce bolting and increase shelf life is applied. Since high far-red, is producing a lower quality rucola the previous lighting recipe can be used in combination of a pre-harvesting continuous light without far red (1 or 2 days) in order to improve appearance of green pigmentation of the leaves and shelf life. Continuous light could be adjusted for one day with a high blue content (e.g. 50% blue and 50% red) similar to coloration recipe in order to speed up the effect before harvest. A short pre-harvest light did not show any incidence on the bolting as the time it is applied is too short for the plant to react and generate flowers. See e.g. example R3 in FIG. 2.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A method of providing horticulture light to a plant in a horticulture arrangement, the method comprising:
providing during a controlling mode first horticulture light to the plant with an average intensity selected from a range of at least 150 $\mu mol/m^2/s$,
wherein at least 15% of photons of the first horticulture light have a wavelength selected from a range of 700-800 nm, wherein at least 45% of the photons of the first horticulture light have a wavelength selected from a range of 640-700 nm, wherein at maximum 10% of the photons of the first horticulture light have a wavelength selected from a range of 400-500 nm, wherein percentages of the photons relate to a total number of photons in a spectral range of 400-800 nm, and wherein the controlling mode includes providing the first horticulture light to the plant during one or more first time periods preceding a harvest and providing a second horticulture light to the plant during one or more second time periods preceding the harvest, the first time periods and second time periods do not overlap, the one or more second time periods are within a period of at maximum three days preceding the harvest, at least 20% of photons of the second horticulture light have a wavelength selected from the range of 400-500 nm, and at maximum 10% of the photons of the second horticulture light have a wavelength selected from the range of 700-800 nm.

2. The method according to claim 1, wherein at least 20% of the photons of the first horticulture light have a wavelength selected from the range of 700-800 nm, and wherein the method comprises providing during the controlling mode the first horticulture light with an average intensity selected from the range of 200-1000 µmol/m$^2$/s over a time period of 10-20 hours per day and with a dark period of 4-14 hours per day.

3. The method according to claim 1, wherein at least 10% of the photons of the first horticulture light have a wavelength selected from the range of 500-640 nm.

4. The method according to claim 1, wherein the plant is selected from the group of kale, spinach, Swiss chard, collard greens, purslane, mustard greens, watercress, rucola, lettuce, dandelion greens, cabbage, arugula, and beet greens.

5. The method according to claim 1, wherein the plant is of a type generating new leaves after harvesting of leaves, wherein the controlling mode comprises controlling the spectral composition of the first horticulture light as function of one or more of: (a) point of time within the life time of the plant, (b) number of harvests, (c) number and/or appearance of bolts, and (d) number and appearance of flowers.

6. The method according to claim 5, wherein the controlling mode includes increasing a contribution of the photons having a wavelength selected from the range of 700-800 nm to the first horticulture light with one or more of: (a) time, (b) number of harvests, (c) number and/or appearance of the bolts, and (d) number and appearance of flowers.

7. The method according to claim 5, wherein the controlling mode comprises providing the first horticulture light only after an n$^{th}$ harvest, wherein n is at least 2.

8. A non-transitory computer program comprising instructions that cause a computing device that is functionally coupled to or comprised by a horticulture lighting system to perform the method of claim 1 when the computer program is executed on the computing device.

9. A method of providing horticulture light to a plant in a horticulture arrangement, the method comprising:
providing during a controlling mode first horticulture light to the plant with an average intensity selected from a range of at least 150 µmol/m$^2$/s, wherein at least 15% of the photons of the first horticulture light have a wavelength selected from a range of 700-800 nm, wherein at least 45% of the photons of the first horticulture light have a wavelength selected from a range of 640-700 nm, wherein at maximum 10% of the photons of the first horticulture light have a wavelength selected from a range of 400-500 nm, and wherein percentages of the photons relate to a total number of photons in a spectral range of 400-800 nm;
wherein the controlling mode includes providing the first horticulture light to the plant during one or more first time periods preceding a harvest and providing a second horticulture light to the plant during one or more second time periods preceding the harvest, wherein the first time periods and second time periods do not overlap, wherein the one or more second time periods are within a period of at maximum three days preceding the harvest, wherein at least 20% of photons of the second horticulture light have a wavelength selected from the range of 400-500 nm, and wherein at maximum 10% of the photons of the second horticulture light have a wavelength selected from the range of 700-800 nm.

\* \* \* \* \*